Nov. 1, 1966   E. LAGELBAUER   3,282,052
BYPASS RAMJET ENGINE WITH HEAT EXCHANGER
Filed April 8, 1964
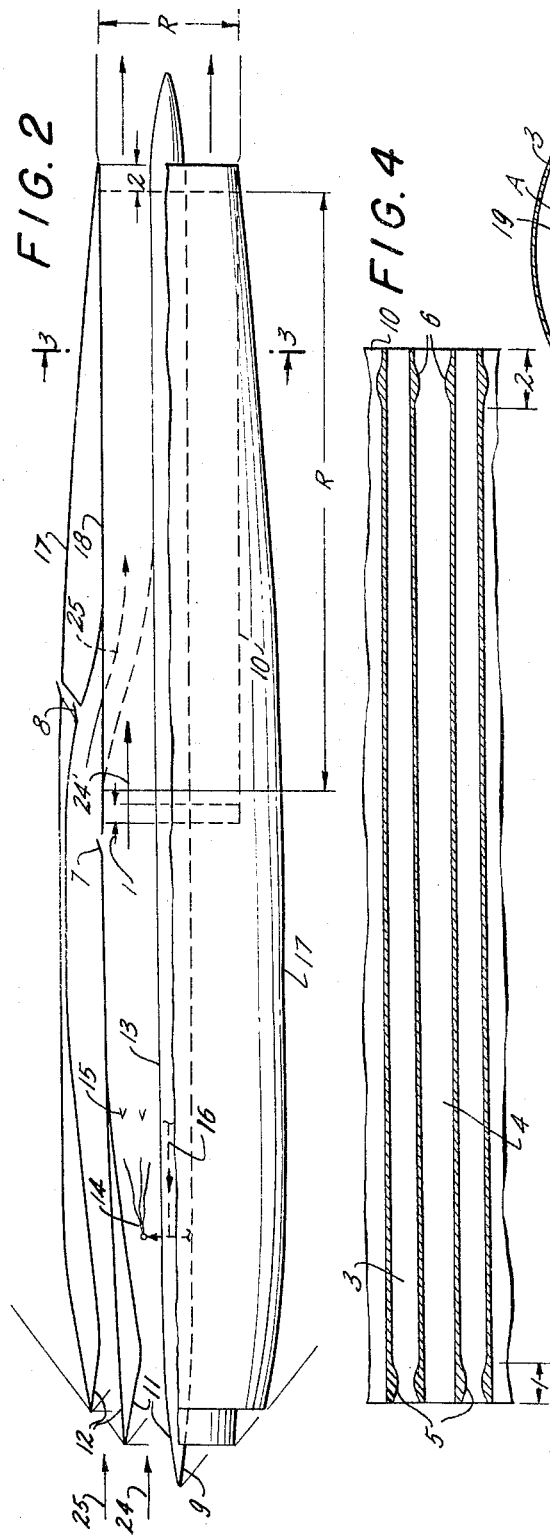
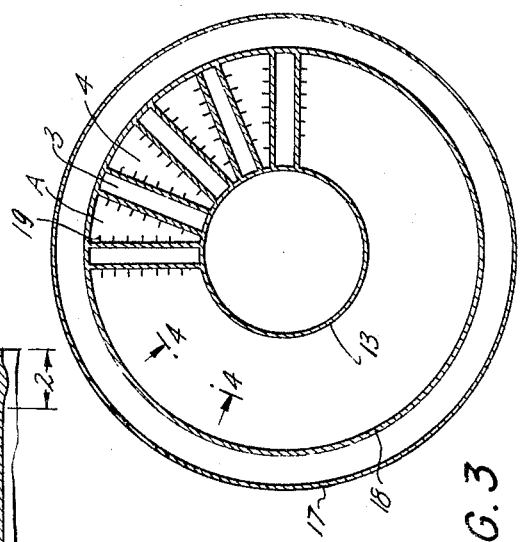
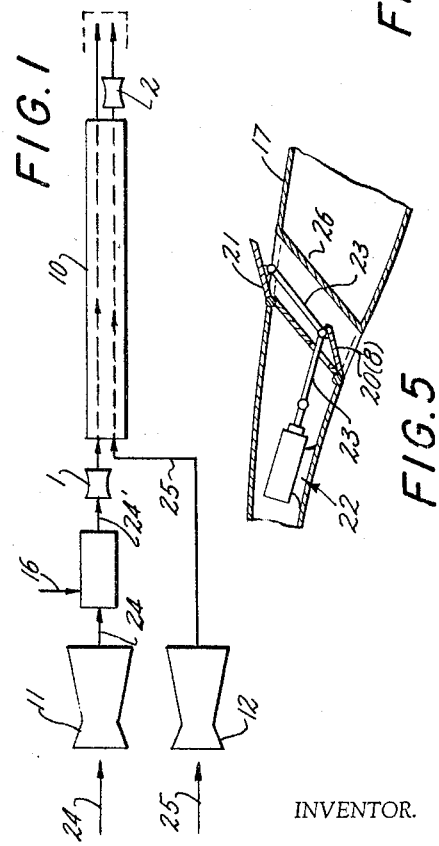
INVENTOR.
ERNEST LAGELBAUER

United States Patent Office 3,282,052
Patented Nov. 1, 1966

3,282,052
BYPASS RAMJET ENGINE WITH HEAT
EXCHANGER
Ernest Lagelbauer, 410 E. 13th St., New York, N.Y.
Filed Apr. 8, 1964, Ser. No. 358,283
4 Claims. (Cl. 60—262)

This invention concerns the recovery and utilization of available heat contained in the jet produced by a ramjet engine by means of rational application of heat transfer from the hot primary propulsive jet to a cool ram-compressed airflow component of the engine system.

The outstanding significance of applying such heat exchange to the ramjet type propulsion engine rests in the circumstance that thereby the inherent advantages of the ramjet engine, such as efficiency, light weight and service endurance, are made available for a more practical flight speed range than that pertaining to efficient performance of a ramjet engine without such heat exchange. Whereas the favorable performance regime of a normal ramjet engine lies beyond Mach 3.5, which is above practical aircrafts speed, the application of heat exchange displaces the favorable performance of the ramjet engine into the region of Mach 1.5 to 3.0.

The shift of the favorable operation speed range from excessively high supersonic speeds towards more practical aircraft speeds is made plausible by analogy with bypass gas-turbine cycles where likewise, application of heat exchange shifts the efficiency maximum into the region of relatively low compression ratios and evidently, the basic thermal cycle of the heat exchange ramjet engine is similar to that of the bypass gas-turbine. However, in the case of the heat exchange ramjet engine instead of providing heat exchange in the conventional manner between the plant discharge and the combustion air, the heat exchange is provided to take place in the plant discharge (propulsion jet) and a dual, ram-compressed airflow component, with reference to thermal cycle diagram FIGURE 1 and schematic engine illustration FIGURE 2. It is of importance with regard to the attainment of optimal efficiency that both, primary flow (combustion gases) and secondary flow (by-pass air) expand directly to the ambient atmospheric pressure, the former before heat abstraction in the heat exchanger, the latter after being heated in passing through the heat exchanger.

It should be noted in regard to the feasibility of the heat exchange ramjet concept that inasmuch as only a range of lower supersonic flight speeds (Mach 1.5 to 3.5) comes into consideration for advantageous applications of it, the effected ram pressure ratio is correspondingly moderate, with the consequence of a fairly small temperature drop accompanying the isentropic expansion of the combustion gases (primary flow) and a fairly small temperature rise due to shock/ram compression of the by pass (secondary flow) air, so that there remains a substantial temperature potential for effective heat transfer in the heat exchanger. Evidently, the available temperature potential is inversely related to the flight speed, and tends to vanish with increasing flight speed; therefore, the specific fuel consumption curve has a minimum which can be expected to be at a flight speed of about Mach 2.5. Since the most favorable flight speed is also affected by the ratio of primary to secondary massflow, the provision of means for varying this ratio within limits appears warranted in cases of application where near optimum efficiency is required also at other than design point conditions (speed, altitude, kind of fuel used). This object can be achieved by incorporation of variable geometry features in the ram nozzle design, or by means of appropriate flow deflecting vanes.

FIG. 1 shows a cycle schematic of the engine. FIG. 2 shows a schematic of the actual engine. FIG. 3 shows a cross-section of the heat exchanger taken on line 3—3 of FIG. 2. FIG. 4 shows the details of the heat exchanger. FIG. 5 shows the details of a by pass air flow bleed valve designated 8 in FIG. 2.

The engine shown by FIGURE 2 uses a heat exchanger with radially arranged flow passage lobes, as illustrated by FIGURE 3, a transverse section at station 3—3, though other configurations of the regenerator are feasible. The combustion gases, which due to expansion in nozzle stage 1 are at near atmospheric pressure, pass with supersonic velocity through the passages 3, while the by-passing air flows at ram pressure and subsonic velocity through passages 4; the isentropic expansion of the by-pass air takes place in nozzle stage 2. Both these nozzle stages are composite in that each flow passage has its own expansion nozzle of sectional shape corresponding to that of the flow passages. The flow passages for the bypass air may be provided with longitudinally arranged fins 19, for promotion of heat transfer and for stiffening the partitions between sectorial spaces 3 and 4.

FIGURE 4 shows a cylindrical section through the heat exchanger as marked 4—4 in FIGURE 3: the De Laval configuration of the expansion nozzles is produced by the nodes 5 for the combustion gas flow, and 6 for the bypass air flow. Inasmuch as the velocity acquired by the combustion gases by expansion in nozzle stage 1 should not be substantially reduced while passing through the heat exchanger for best performance of the engine and with regard to the diminution of their specific volume due to heat transfer to the bypass air, the flow passages for them should be made slightly converging and the degree of convergence made strictly correct for the principal performance condition of the engine, while the involved performance impairment under other performance conditions can be compromised with in view of minor magnitude and the relatively brief duration of such performance conditions.

As the throat of a De Laval nozzle, where critical sonic velocity persists, represents a limitation of the massflow rate, it is necessary in the event that operation under overloading the engine is required (for instance when flying at the design cruising speed at lower than design point altitude) to provide means for adjusting to such conditions: this can be accomplished by providing suitable relief gates for spilling combustion gases into the bypass air duct and, under circumstances, by spilling bypass air to the outside (with variable intake nozzle geometry, the proportion of combustion to bypass air may be suitably adjusted). The relief gates for avoiding flow choke may be made automatically operating or their operation incorporated in the general engine instrumentation and control system. In FIGURE 2, relief gates for spilling combustion gases are marked 7, those for spilling bypass air 8.

Mention is made of one of the possible ways of varying the intake nozzle configuration for adjusting the proportion of primary to secondary massflow, consisting in making the central spike 9 of the intake nozzle position-variable: moving the spike forward induces a larger proportion of the total air intake to enter the bypass air duct. The positioning of the spike influences also the ram pressure in the combustion air duct and in the bypass air duct; normally, with correct design of the ram nozzle configuration, these pressures are equal.

FIGURE 5 shows the relief gate 8 for the bypass flow component in some more detail: the two hinged valve flaps 20 and 21 are connected by a rod to which the actuating device 27, for instance a hydraulic cylinder-piston mechanism, is attached. It should be noted that in the position shown, a near vacuum pressure is induced at the discharge end of tube 26, due to the supersonic relative air stream past gate member 21, thereby providing a highly effective pressure differential.

Mention is made that the flow adjustment to overload conditions is largely self-induced (automatic), inasmuch as the critical sonic velocity at the nozzle throats stands in a direct relation with the there prevailing temperature and as overloading the engine is associated with higher temperature and larger ram pressure ratio of both, primary and secondary flow components, the respective massflow rates are correspondingly augmented.

List of designations:
1—expansion nozzles for combustions gases
2—expansion nozzles for bypass air
3—flow passages for combustion gases in heat exchanger 10
4—flow passages for bypass air in heat exchanger 10
5—ridge generating De Laval nozzle configuration for combustion gases
6—ridge generating De Laval nozzle configuration for bypass air
7—overflow gates for combustion gases
8—overflow gates for bypass air
9—central spike of ram nozzle
10—heat exchanger
11—ram nozzle for primary flow (combustion air)
12—ram nozzle for secondary flow (bypass air)
13—control body
14—fuel burners
15—flame holder
16—fuel line
17—exterior contour of ramjet engines
18—outer shell of heat exchanger 10
19—heat exchanger fins
20—inner hinged flap of relief gate assembly 8
21—outer hinged flap of relief gate assembly 8
22—actuating device (hydraulic, pneumatic or electric)
23—connecting rods
24—primary airflow (combustion air)
24'—combustion gasflow
25—bypass airflow
26—tube (tubes) leading from bypass air duct to engine outside
R—effective portion of heat exchanger 10

These features as herein described and illustrated by drawings embody the essential of my invention, and while the presented information admits of variation and modifications it should be understood therefore, that this information is intended to set forth the basic, not to limit the scope thereof.

I claim:
1. A bypass ramjet propulsion engine comprising in a first series flow path, a main ram air inlet, a combustion chamber including fuel nozzles and flame holders, a heat exchanger; a bypass duct in flow parallel with said first ram air inlet, combustion chamber and heat exchanger; said bypass duct defining in a second series flow path a second ram air inlet, a transition flow means, and said heat exchanger; said heat exchanger effecting an indirect transfer of heat from a high velocity gas flow from said combustion chamber to the air stream flowing from said bypass transition duct; the heat exchanger being made up of a first set of passages through which the high velocity burned gases are isentropically expanded to supersonic velocity and a second set of parallel passages through which the bypass gases flow at subsonic velocity in heat exchange relationship with the supersonic combustion gases; means at the downstream end of said second set of passages to expand the bypass gases isentropically; the combustion gas and bypass gas being mixed downstream of the heat exchanger.

2. A bypass ramjet propulsion engine as defined in claim 1 wherein there are means upstream of the heat exchanger for diverting an excess part of the combustion gas from said first series flow path into said bypass flow path.

3. A bypass ramjet propulsion engine as defined in claim 1 wherein there are means in said transition flow means upstream of said heat exchanger to divert bypass air from the transition flow means out of the engine.

4. A bypass ramjet engine as defined in claim 1 wherein the two inlets are positioned adjacent one another in concentric relationship and wherein an inlet control spike is located in the first inlet which spike is axially positionable to vary the intake configuration of the first inlet to vary the proportion of total air flow into the engine between the first and second inlets.

References Cited by the Examiner

UNITED STATES PATENTS

| | | | |
|---|---|---|---|
| 2,357,251 | 8/1944 | Behr | 165—174 X |
| 2,588,532 | 3/1952 | Johnson | 60—35.6 |
| 2,692,480 | 10/1954 | Viaud | 60—35.6 |
| 2,850,873 | 9/1958 | Hausmann | 60—35.6 |
| 3,181,817 | 5/1965 | Marcus | 60—35.6 |
| 3,208,383 | 9/1965 | Larson | 60—35.6 |

FOREIGN PATENTS 800,871  9/1958  Great Britain.

MARK NEWMAN, *Primary Examiner.*